United States Patent [19]
Mallow

[11] Patent Number: 5,976,244
[45] Date of Patent: Nov. 2, 1999

[54] FIXATION OF HAZARDOUS WASTES AND RELATED PRODUCTS

[76] Inventor: William A. Mallow, 10041 Rafter S. Trail, Helotes, Tex. 78023

[21] Appl. No.: 09/017,584

[22] Filed: Feb. 3, 1998

[51] Int. Cl.⁶ .................................. B09B 3/00; A62D 3/00
[52] U.S. Cl. ........................... 106/813; 423/713; 588/256
[58] Field of Search .................................. 423/700, 713; 106/813; 588/252, 256, 901

[56] References Cited

U.S. PATENT DOCUMENTS

| | | |
|---|---|---|
| Re. 31,575 | 5/1984 | Ludwing et al. . |
| 3,769,386 | 10/1973 | Rundell et al. . |
| 4,290,816 | 9/1981 | Ludwig et al. . |
| 4,859,367 | 8/1989 | Davidovits . |
| 5,283,047 | 2/1994 | Vaughan et al. . |
| 5,484,533 | 1/1996 | Crawford et al. . |
| 5,494,513 | 2/1996 | Fu et al. . |
| 5,569,153 | 10/1996 | Mallow et al. . |

FOREIGN PATENT DOCUMENTS 3940903  6/1991  Germany .

OTHER PUBLICATIONS

Meier et al., "Atlas of Zeolite Structure Types," Third Edition, pp. 100–101, 1992.

*Primary Examiner*—Mark L. Bell
*Assistant Examiner*—David Sample

[57] ABSTRACT

A method of fixation of hazardous waste materials is disclosed wherein the hazardous waste is admixed with materials capable of reacting in situ to form zeolites and the mixture subjected to conditions sufficient to form zeolites in which the hazardous material is part of the zeolite structure. The invention also relates to the resultant synthetic zeolite and to products formed by embedding the synthetic zeolites in a modified sulfur cement.

7 Claims, No Drawings

FIXATION OF HAZARDOUS WASTES AND RELATED PRODUCTS

BACKGROUND OF THE INVENTION

The present invention relates to the method of fixation of hazardous waste and to products that can be made therefrom.

Large amounts of hazardous wastes are generated by industrial and municipal procedures that require disposal, such as incinerator wastes. Such wastes are hazardous primarily because they contain heavy metals and salts thereof which are quite toxic. Presently, such wastes are placed into landfill disposal sites. Such has not proven to be desirable due to leaching from such sites into the subsoil, into water supplies, and, in some instances, the large costs involved in preparing such sites to prevent such leaking and contamination of water tables.

Further, incinerators are increasingly used as means of handling garbage and other wastes by municipalities and industries thereby increasing the amount of hazardous waste to be disposed thereby greatly increasing the costs due to the need to find additional disposal sites and in terms of preparing sites for storage of the same. This is particularly true as more and more communities are finding that the areas available for waste disposal, particularly hazardous waste disposal, are becoming more and more limited.

U.S. Pat. No. 5,569,153 discloses a highly suitable method for disposal of hazardous waste, but the amount of waste that can be so treated and immobilized by the invention set forth therein is quite limited, comprising only up to ten or so percent by way of the total weight of the composition formed to immobilize the waste.

SUMMARY OF THE INVENTION

The present invention provides a method for the fixation of hazardous waste which overcomes the problems of the prior art that is economic and from which also useful products can be formed.

Briefly stated, the present invention comprise a method of fixation of hazardous waste materials comprising admixing the hazardous waste with materials capable of reacting in situ to form zeolites and reacting said materials under conditions to form zeolites in which the hazardous material is part of the zeolite structure.

The structural products that result are then preferably coated or encapsulated with a modified sulfur cement so as to form granular or monolithic products containing the waste which will prevent any wasteful leaching therefrom and thus can be stored above or below ground.

If formed into monolithic products, such as blocks or bricks, such can be utilized to form structures and such products are hereinafter set forth and for a part of the present invention.

DETAILED DESCRIPTION

The hazardous wastes that are utilized in the instant invention are those containing heavy metals that result either from industrial or municipal processes, such as incinerators handling wastes from household or industrial sites as well as the heavy metal wastes from industrial facilities such as furnace dust from electric arc furnaces, EDTA strippants used in removing heavy metals from lead columns, refuse from coal burning and refuse burning, waste streams from mining and refining of metals (such as noble metals), aqueous waste streams from industrial and municipal operations, and the like. As previously noted, such wastes have heretofore and are still presently being placed into landfills. Such practice is undesirable, both in terms of contamination of ground water and unknown long-term effects.

The initial step of the process is the mixing of such waste which is usually in a slurry form or, if not in slurry form, placed in a slurry form by addition of water thereto, with reactants capable of forming zeolites.

Zeolites, both naturally occurring and synthetic, are complex, crystalline inorganic polymers based on a framework of $AlO_4$ and $SiO_4$ tetrahedra linked to each other by the sharing of oxygen ions. This framework structure contains channels or interconnected voids that are occupied by the cations and water molecules, the water can be removed reversibly by the application of heat which leaves intact a crystalline host structure permeated by micropores which amount to 50% of the crystalline structure by volume.

Such zeolites are naturally occurring but synthetic zeolites can also be prepared and typically by reaction such as silicates and polyvalent metals, ordinarily certain types of aluminum compounds.

It is a unique aspect of the instant invention that it has been found that by using silicates and aluminum compounds together with the hazardous waste containing toxic ions that such mixture can then be reacted to generate in situ synthetic zeolites in which the heavy metals are complexed so as to be incorporated and combined chemically as part of the zeolite crystalline structure. Also, by carefully regulating the proportions of the waste containing the heavy metal toxic ions, that one is able to have large amounts of the toxic waste captured in the synthetic zeolite and to provide a resultant solid synthetic zeolite that can resist any leaching of the toxic metal ions therefrom.

As the reactants to form the in situ zeolites there are utilized in addition to the hazardous waste containing the toxic ions, silicates and aluminum compounds known to be suitable for forming synthetic zeolites.

Suitable silicates are any presently used for the formation of synthetic zeolites such as silicic acid, colloidal silica, sodium silicate, hydrous and anhydrous sodium silicate powders and potassium silicates. Of these, anhydrous sodium silicate powder having a ratio of silica/$NaO_2O$ of 2.1–3.22:1 is preferred.

As to the aluminum compound, it is preferred to use aluminum hydroxide because of its ready availability, but other aluminum compounds such as sodium aluminate and aluminum tetrahydrate can also be utilized. Other compounds that can be utilized are aluminum phosphate solutions. In addition to the aluminum, one can utilize other polyvalent metals such as zinc and calcium in forming the in situ zeolite.

In completing the process of the instant reaction, after the waste and reactants are mixed together they are formed into a firm mass such as a cake or plastic mass, either removing water if too much water is utilized or adding water if required, depending upon the nature of the hazardous waste material utilized and the mass compacted. It is only necessary that the mixture (cake) be solid enough to be readily handled. The precise amount of water for any given combination of waste and reactants can be readily lowered determined by routine experimentation.

The resultant compacted solids are then heated, preferably under confined pressure, at a temperature sufficient to and for a time sufficient to form the zeolite. Such reaction can be carried out as a batch process in an autoclave or in a continuous extrusion device wherein the original mass is an inert barrier plug which imposes back pressure on the mass and prevents water loss during the critical curing phase.

Ordinarily, a temperature of about 250–350° F. is utilized for approximately one hour is required to induce the chemical fixation of the toxic heavy metal ions in the hazardous waste with the synthetic zeolite being generated during the process.

It is preferred to utilize a saturated steam pressure to provide the necessary environment to form such in situ zeolites.

The resultant product is a strong solid agglomerate of the zeolite with sufficient integrity to stand alone and resist leaching even when subjected to the EPA leaching test for TCLP by methodology SW846 Method 1311. This methodology involves grinding the solids as they pass through a 200 mess screen (Tyler) and leaching in a 5% acetic acid solution for 24 hours as required by the noted EPA procedure. The leachate is tested for any heavy metal contained therein to determine if it meets the EPA criteria for hazardous leachate.

The essential reactants are noted above; namely, the hazardous waste and the reactants necessary to form the in situ zeolite. However, it is also possible to add certain other materials such as fillers if it desired to increase the strength of the aggregates formed. Such inert materials to strengthen the structure include sand, talc, clay, limestone, basalt, old ground concrete, bentonite and other like inert filler materials.

In certain instances where it is desired to have a larger self-supporting mass to be delivered to the curing process, i.e., a steam chamber or other appropriate environment for curing, it is possible to add amounts of a hydraulic cement to provide such initial green strength and handling of room temperature molded shapes. Any conventional hydraulic cement such as Portland cement, plaster-of-paris, high alumina cement, calcium aluminate cement and the like can be utilized for this purpose.

The net result is a reaction product, an in situ formed zeolite in which the heavy metal salts are contained which is water insoluble, highly silicious and a coherent self-supporting solid of some significant strength.

Although of sufficient strength, it can be easily comminuted or granulated into an aggregate for encapsulation or incorporation with a sulfur cement. Aggregate size or particle size is preferably of about ¼ to ½ inch in diameter.

The sulfur cement utilized for this purpose is formed by the methods shown in U.S. Pat. No. 4,290,816 and the Reissue thereof, U.S. Pat. No. RE 31,575 whose entire specifications are specifically incorporated herein by reference. Such sulfur cements are formed by reacting sulfur with about 10% by weight of a hydrocarbon, preferably vinyl toluene, dicyclopentadiene, or mixes thereof, to form a sulfur reaction product which is more amorphous in nature as opposed to being crystalline. The zeolite aggregates are coated or embedded in the modified sulfur cement reaction product which has been placed into molten form and the end product has even greater compressive strengths, for example, up to at least 10,000 psi.

It is also within the scope of the invention to add pozzolana and the usual fillers, such as sand, to the aggregate and the sulfur cement and other calcitic or silicious aggregates in order to form concrete products if it is desired to cast (thermoplastically) masses of water impermeable and easily repairable shapes such as brick, slabs, and construction blocks.

An important aspect of the instant invention is that by forming the zeolite in situ one is able to trap larger amounts of the metals, thereby obtaining a five-fold increase in the amount of waste that can be handled over that set forth for example in U.S. Pat. No, 5,569,153.

The invention will be further described in connection with the following examples which are set forth for purposes of illustration only. The toxic waste liquid used in the examples was an industrial leachate in which EDTA was used to chelate the metals. It had the following composition:

| | Parts Per Million (PPM) |
|---|---|
| Iron | 19,300 |
| Nickel | 433 |
| Chromium | 24 |
| Manganese | 198 |
| Aluminum | 27 |
| Calcium | 22 |
| Phosphate | 32 |
| EDTA | 281 g/liter |

EXAMPLE 1

The materials set forth in Table I below are blended to thoroughly admix the same and pressed into a firm cake.

TABLE I

| | Parts By Weight |
|---|---|
| Toxic waste liquid | 100 |
| Anhydrous Sodium Silicate powder* | 100 |
| Aluminum hydroxide | 20 |
| Zinc oxide | 10 |
| Water | QED |

*2:1 to 3:22:1 ratio of silica/$Na_2O$

The pressed cake is heated in an autoclave at 250–300° F. and corresponding saturated steam pressure for approximately one hour. The resulting product is a strong solid synthetic zeolite which resists leaching via TCLP. Such product was tested using the EPA leaching test set forth above and the leachate contained the following elements, corrected for dilution, with the symbol "<" indicating the limits of detection of the testing devices used.

|  | (PPM) |
| --- | --- |
| Iron | 55 |
| Nickel | 59 |
| Chromium | 5 |
| Manganese | 12 |
| Aluminum | <25 |
| Calcium | <5 |
| Phosphate | 11 |
| EDTA | 28.1% |

The procedure of Example 1 is carried out except 200 parts by weight of the sodium silicate powder is used.

It is found that there is a large increase in fixation of the metals. The results are set forth below:

|  | (PPM) |
| --- | --- |
| Iron | <5 |
| Nickel | <0.25 |
| Chromium | <0.25 |
| Manganese | <0.25 |
| Aluminum | <25 |
| Calcium | <5 |
| Phosphate | <1 |
| EDTA | 15.7% |

EXAMPLE 3

The solid of Example 2 is comminuted into particles ¼ to ½ inch in size and these particles then embedded (encapsulated) in a molten sulfur cement and the encapsulated particles sintered into shapes (blocks and bricks) by compaction and heating.

Dependent upon the degree of compaction, such shapes can have densities ranging from 50–150 psi with compressive strengths of 2,000–10,000 psi.

Such shapes containing the insolubilized heavy metals are suitable for storage below or above ground without fear of leaching and can even be used as conventional cinder block and brick to form structures, pathways, walls and the like.

EXAMPLE 4

(a) The procedure of Example 2 is carried out except that 100 parts by weight of spray dried sodium silicate (BRITESIL C-24) was substituted for the anhydrous sodium silicate powder. Equally satisfactory solid synthetic zeolites containing the heavy metals of the toxic waste liquid are formed.

(b) The product of (a) above was further processed utilizing the procedure of Example 2 and is equally found suitable block and brick.

EXAMPLE 5

The procedure of Example 2 is carried out except that only 100 parts by weight of the silicate powder is used and there is added 50 parts by weight of Portland cement.

The cake formed after pressing has greater strength than the cake of Example 1, and when kept at ambient temperature for 10–12 hours forms a self-supporting solid mass which is more readily handled for the further processing, such as delivery to an autoclave.

EXAMPLE 6

The procedure of Example 5 is carried out except that 4 parts by weight of bentonite are included in the initial mixture.

The resultant product has a higher density and compressive strength than the synthetic zeolite of Example 5.

It is also found that utilizing solid toxic waste in place of liquid toxic waste results in substantially same results as long as sufficient fluid; i.e., water, is added to ensure proper zeolite formation. This is illustrated in Example 7 below.

EXAMPLE 7

A steel dust having the analysis set forth below was utilized in the procedure of Example 2 in place of the toxic waste liquid used therein.

|  | (PPM) |
| --- | --- |
| Cadmium | 51.3 |
| Chromium | 107 |
| Lead | 3,550 |
| Mercury | 0.73 |
| Zinc | 12,860 |

After treatment in accord with Example 2, the solid product was tested using the EPA leaching test set forth above and the leachate had the following composition, corrected for dilution, with the symbol "<" indicating the limits of detection of the testing devices used.

|  | (PPM) |
| --- | --- |
| Cadmium | <0.003 |
| Chromium | 0.03 |
| Lead | 0.22 |
| Mercury | <.10 |
| Zinc | 0.185 |

The invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A product consisting essentially of a modified sulfur cement having imbedded therein a synthetic zeolite consisting essentially of heavy metal ions from hazardous waste incorporated in an in situ formed synthetic zeolite, being the product of a method of fixation of heavy metal-containing hazardous wastes comprising:

forming a mixture consisting essentially of a hazardous waste containing heavy metal ions, an aqueous fluid, and reactants known to be capable of reacting to form zeolites, and subjecting said mixture to a temperature sufficient and for a time sufficient to cause said reactants to react to form in situ a synthetic zeolite solid incorporating said heavy metal ions.

2. The product of claim 1 wherein the reactants capable of forming zeolites are polyvalent metal compounds suitable for forming synthetic zeolites.

3. The product of claim 2 wherein the polyvalent metal compounds used are a combination of silicate and aluminum compounds.

4. The product of claim 3 wherein the silicate compound is silicic acid, colloidal silica, hydrous or anhydrous sodium silicate powder, potassium silicates, or a mixture thereof.

5. The product of claim 3 wherein the silicate compound is silicic acid, colloidal silica, hydrous or anhydrous sodium silicate powder, potassium silicates, or a mixture thereof.

6. The product of claim 3 wherein the silica compound is anhydrous sodium silicate powder having a silica/$Na_2O$ ratio of 2.1–3.22:1 and the aluminum compound is aluminum hydroxide.

7. The product of claim 1 including calcitic or silicious aggregates and a filler in an amount sufficient to form a concrete.

* * * * *

UNITED STATES PATENT AND TRADEMARK OFFICE
CERTIFICATE OF CORRECTION

PATENT NO. : 5,976,244
DATED : November 2, 1999
INVENTOR(S) : William A. Mallow

It is certified that error appears in the above-identified patent and that said Letters Patent is hereby corrected as shown below:

On the title page, insert item [73], to read

--Southwest Research Institute, San Antonio, Texas--

Signed and Sealed this

Fifteenth Day of August, 2000

Attest:

Q. TODD DICKINSON

Attesting Officer     Director of Patents and Trademarks